June 19, 1962 W. D. WHITE 3,040,257
MEANS FOR GENERATING A SYMMETRICAL GATE VOLTAGE
Filed April 5, 1954
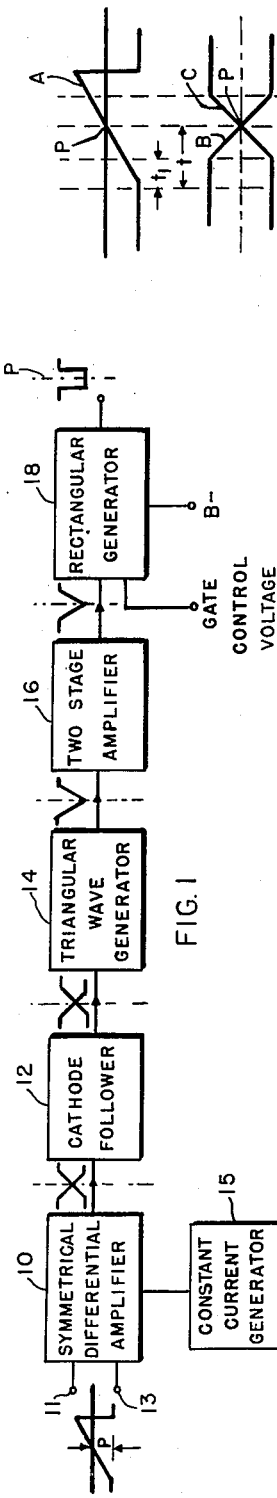
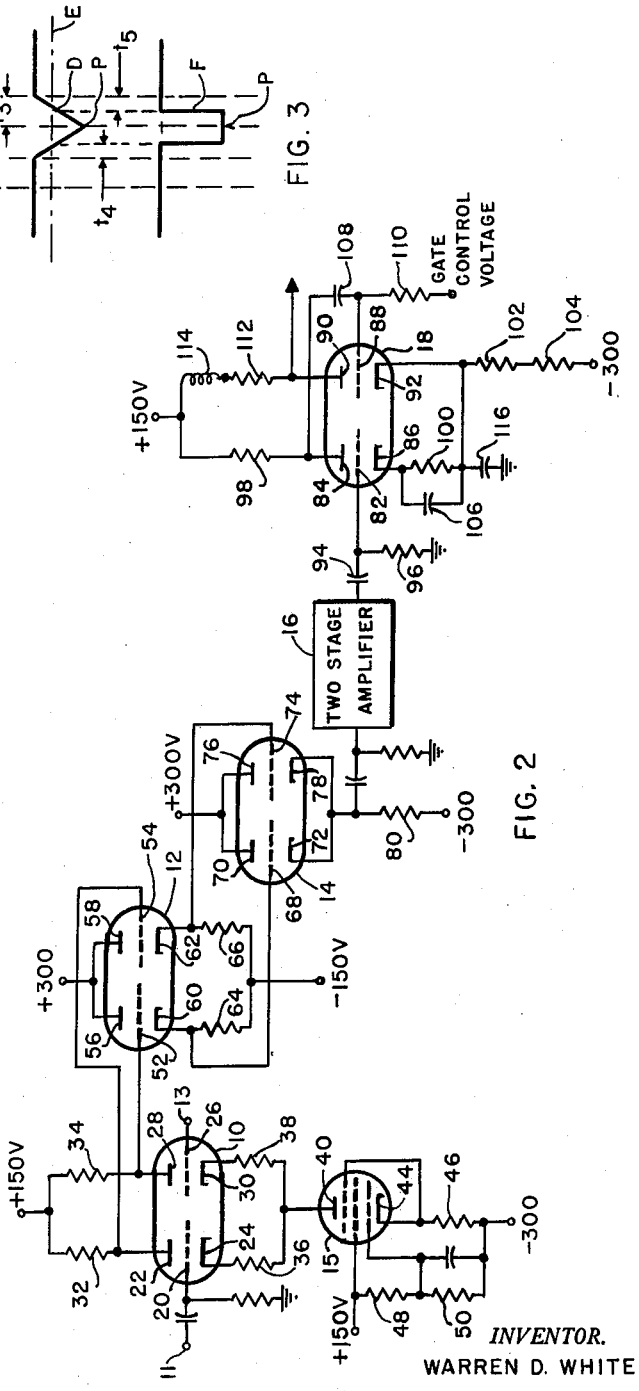
INVENTOR.
WARREN D. WHITE
BY
Harry M. Saragovitz
ATTORNEY

United States Patent Office 3,040,257
Patented June 19, 1962

3,040,257
MEANS FOR GENERATING A SYMMETRICAL GATE VOLTAGE
Warren D. White, West Hempstead, N.Y., assignor to the United States of America as represented by the Secretary of the Army
Filed Apr. 5, 1954, Ser. No. 421,210
5 Claims. (Cl. 328—34)

This invention relates to a method and means for generating gate voltages and more particularly to a means for generating a gate voltage symmetrically arranged with respect to a predetermined reference.

In track-while-scan systems, automatic tracking is accomplished by predicting target slant range and azimuth from past target range and azimuth data. It is usually necessary in such systems to provide means for separating the range data for a particular target from the other data of the search radar and to restrict the output of the track-while-scan channel to a region centered about the range of the predicted target position. This may be accomplished by utilizing rectangular gates generated symmetrically about the predicted position of the target. These gates, of course, are rectangular-shaped voltage pulses which may be applied to a suitable indicator such as a B scope. By such an arrangement, high resolution is obtained inasmuch as the random noise about the predicted target area is minimized. This is especially true for track-while-scan systems which function in accordance with the center-of-gravity error principle of operation.

It is an object of the present invention therefore to provide a rectangular gate generator symmetrically arranged with respect to a predetermined reference.

It is another object of the present invention to provide a variable width gate generator symmetrically arranged with respect to a predetermined reference.

In accordance with the present invention there is provided a pulse generating circuit including means for generating a pair of equal but oppositely sloping signal voltages symmetrically about a reference voltage having a predetermined amplitude. These sloping voltages have uniform slopes and cross-over at a voltage equal to the predetermined amplitude. Also included are means responsive to the sloping signal voltages for generating a triangular wave voltage having a base equal to the duration of the sloping voltage and having an apex equal in amplitude to one-half the voltage swing of the sloping waves. The pulse generating circuit further includes means responsive to the triangular wave voltage for generating a rectangular voltage signal having its width symmetrically arranged about said apex.

For a better understanding of the invention, together with other and further objects thereof, reference is had to the following description taken in connection with the accompanying drawing in which:

FIGURE 1 is a block diagram of the pulse generating circuit embodying the invention;
FIGURE 2 is a schematic circuit diagram illustrating in detail the pulse generating circuit; and
FIGURE 3 includes a group of explanatory waveforms.

Referring now to FIGURE 1 there is shown at 10 a symmetrical differential amplifier having input terminals 13 and 11 to which are respectively applied the direct-current voltage analog of the predicted slant range and a precision linear sawtooth voltage corresponding to the slant range scan time base. Differential amplifier 10 is connected to a negative source of potential by means of constant current generator 15. A pair of waves with opposite but equal slopes are generated in the output circuit of differential amplifier 10, which are proportional over a limited range to the difference between the slant range sawtooth voltage and the predicted slant range direct-current voltage, and whose crossover occurs at this predicted voltage. The sloping wave outputs from differential amplifier 10 are applied through cathode follower 12 to a triangular wave generator 14 to produce a negative going triangular-shaped voltage whose base is equal in time to the width of the sloping waves, and whose apex is equal in amplitude to one-half the voltage swing of the sloping waves. The apex of the triangular-shaped voltage thus corresponds in time to the crossover voltage point of the sloping waves which is the predicted slant range of the target. The triangular voltage wave output from generator 14 is fed to a rectangular gate generator 18, through two-stage amplifier 16 which narrows the triangular wave output from generator 14 and increases its sloping sides in volts per microsecond. As explained below, rectangular generator 18 provides a rectangular voltage waveform symmetrically arranged about a reference which corresponds to the predicted slant range. A gate control voltage is also applied to rectangular gate generator 18 for varying the width of the gate symmetrically about the reference voltage.

For a detailed description of the circuit and its operation, reference is made to FIGURES 2 and 3. Symmetrical differential amplifier 10 comprises two vacuum tubes, each having a grid, plate, and a cathode. The tubes are shown within a single envelope, one tube comprising grid 20, plate 22 and cathode 24, and the other tube comprising grid 26, plate 28 and cathode 30. Plates 22 and 28 are connected to B+, herein shown as +150 volts, through resistors 32 and 34 respectively. Cathodes 24 and 30 are connected through respective resistors 36 and 38 to plate 40 of a constant current generator tube 15. Cathode 44 of tube 15 is connected to B—, herein shown as —300 volts, through resistor 46. Suitable direct-current potentials are applied to the screen and control grids of constant generator tube 15 through voltage dividing resistors 48 and 50 connected between the screen grid and the —300 volt source.

The outputs from plates 22 and 28 are applied respectively to the discrete grids 52 and 54 of cathode follower stage 12 which is shown as comprising two vacuum tubes within a single envelope. The plates 56 and 58 are connected to B+, herein shown as +300 volts, and cathodes 60 and 62 of cathode follower stage 12 are connected to B—, herein shown as —150 volts, through resistors 64 and 66 respectively. Triangular generator 14 also comprises two vacuum tubes within a single envelope connected as a differential amplifier. One half of triangular generator 14 includes grid 68, plate 70 and cathode 72 and the other half of triangular generator 14 includes grid 74, plate 76 and cathode 78. Plates 70 and 76 are connected to B+, herein shown as +300 volts, and cathodes 72 and 78 are connected to B— (—300 volts) through resistor 80. As shown, the discrete outputs from cathodes 60 and 62 are applied respectively to grids 68 and 74. The output from triangular generator 14 is developed across resistor 80 and is coupled to rectangular generator 18 through two-stage amplifier 16 which is of conventional design so that no detailed description thereof is required.

Rectangular generator 18 comprises two tubes within a single envelope, one half of said generator comprising grid 82, plate 84 and cathode 86 and the other half of rectangular generator 18 includes grid 88, plate 90, and cathode 92. The output of amplifier 16 is coupled to grid 82 through capacitor 94 and resistor 96 which is connected between grid 82 to ground. Plate 84 is connected to B+, shown as +150 volts, through plate load resistor 98. Cathode 86 is connected to the —300-volt source through series connected resistors 100, 102 and 104. A bypass capacitor 106 is connected across resistor 100.

The output from plate 84 is coupled to grid 88 through coupling capacitor 108 and resistor 110, one end of which is connected to grid 88 and the other end is coupled to a gate control voltage for adjusting the width of the output of gate generator 18 as will hereinafter be explained. Plate 90 is connected to the +150 volt source through plate load resistor 112 and series peaking inductance coil 114. Cathode 92 is connected to the junction of resistors 100 and 102 and is bypassed to ground through capacitor 116. As shown, the rectangular output gate from generator 18 is derived from plate 90.

For purposes of explaining the operation of the gate generator, reference is made to the wave forms shown in FIGURE 3. The input voltage applied to grid 20 of symmetrical differential amplifier 10 is the precision linear sawtooth voltage waveform A which corresponds to the slant range scan time base. The predicted slant range voltage may be represented as a direct-current potential having an amplitude P with respect to the baseline of waveform A which corresponds to the voltage amplitude reached by sawtooth voltage wave A after the duration $t$. At the beginning of each scan time base applied to grid 20, it is to be assumed that, with the predicted slant range direct-current voltage applied to grid 26, the right half of differential amplifier 10 is at saturation and the left half thereof is at cutoff. The potentials applied to the elements of differential amplifier 10 are so chosen that as the rising sawtooth voltage waveform A is applied to grid 20, the left half of symmetrical differential amplifier will be rendered conductive at a time $t_1$ prior to reaching amplitude level P of the predicted slant range voltage. At this point, there is an effective push-pull action in both halves of amplifier 10 and there is thus produced respectively at plates 22 and 28 the upward and downward sloping voltage signals B and C having equal but opposite uniform slopes of about 1.2 volts per microsecond. It is readily apparent that both halves of the tube 10 will conduct the same amount of current when the sawtooth voltage applied to grid 20 reaches the amplitude P of the predicted slant range so that there is generated at the plates 22 and 28 two equal but oppositely sloped output voltages B and C which effectively cross over at the predicted range voltage for each linear sawtooth timing wave A.

The sloping voltages B and C are applied respectively to grids 68 and 74 of triangular wave generator 14 through output cathodes 60 and 62 of cathode follower stage 12. The left half of triangular wave generator 14 will conduct only for the time that sloping voltage signal B is more positive than the sloping voltage signal C and during this interval, $t_2$, the right half of the triangular generator 14 will be cut off. At the crossover voltage, the right half of the triangular generator 14 will be rendered conductive and the left half will be cut off. This condition will prevail for the duration $t_3$ when the sloping wave voltage signal C is more positive than the sloping voltage signal B. The resultant output from cathode 80 of triangular generator 14 is a negative going triangular wave shown in curve D whose base is equal in time, $t_2+t_3$, to the width of sloping voltage signals B and C, and whose apex is equal in amplitude to one-half the voltage swing thereof. The apex of triangular wave D thus corresponds in time to the crossover voltage P of the sloping voltage signals which, of course, is the predicted slant range of the target.

The triangular voltage D is coupled to grid 82 of rectangular generator 18 through two-stage amplifier 16. Rectangular gate generator 18 is effectively an amplifier adapted to provide an $E_g$–$E_p$ characteristic such that, once conduction is started at a prescribed grid voltage $E_g$, the output plate voltage $E_p$ will almost instantaneously reach its minimum level and will remain at this level regardless of any change in further applied grid voltage until cut-off is reached. At this time the output plate voltage $E_p$ will almost instantaneously reach its maximum level. An amplifier having these characteristics is known as an infinite gain amplifier and is fully described on pages 475–477 in volume 11 of the MIT Radiation Laboratory Series. For all practical purposes, such instantaneous rise and fall of plate voltage will provide a pulse with sides of infinite slope. The right half of gate generator 18 is maintained at cutoff by means of a variable gate control voltage E applied to grid 88 through resistor 110, and the left half of generator 18 is biased so that it is conducting. Before the right half of tube 18 can conduct, the cutoff bias due to gate control voltage E must be overcome. For the duration $t_4$ of triangular voltage wave D, the right half of tube 18 will remain cut off but at the end of $t_4$, the right half of tube 18 will be rendered conductive by the positive going voltage coupled from plate 84 to grid 88 through capacitor 108 and resistor 110. As a result, the left-hand side of tube 18 will be cut off due to the current passing through resistors 102 and 104 and cathode-plate circuit 92, 90. The left half of generator 18 will remain cut off for as long as the right-hand side remains conductive. Thus for the duration $t_5$, the application of triangular wave D to grid 82 of the left half of generator 18 will have no effect on the output of plate 90. At the end of $t_5$, however, the left half of generator 18 will again be rendered conductive and the cathode voltage developed across resistors 102 and 104 due to the plate current flowing in the left section of generator 18 will maintain the right section at cutoff. The output of plate 90 is therefore a rectangular wave F with sides of substantially infinite slope which is symmetrically arranged about a point P corresponding in time to the crossover voltage P which is the predicted slant range of the target. Any variation of the gate control voltage will merely vary the width of wave F but will not affect the symmetrical arrangement about the point P.

While there has been described what is at present considered to be the preferred embodiment of this invention, it will be obvious to those skilled in the art that various changes and modifications may be made therein without departing from the invention, and it is therefore, aimed in the appended claims to cover all such changes and modifications as fall within the true spirit and scope of the invention.

What is claimed is:

1. A pulse generating circuit comprising means for generating a pair of equal but oppositely sloping signal voltages symmetrically about a direct-current voltage having a predetermined amplitude with respect to a prescribed reference voltage, said signal voltages having uniform slopes and crossing at a voltage equal to said amplitude, means responsive to said sloping signal voltages for generating a triangular wave voltage having a base equal to the duration of said sloping voltages and having an apex equal in amplitude to one-half the voltage swing of the sloping waves, and means responsive to said triangular wave voltage for generating a rectangular voltage signal having its width symmetrically arranged about said apex.

2. A pulse generating circuit comprising a source of equal but oppositely sloping signal voltages having uniform slopes and symmetrically arranged about a direct-current voltage having a predetermined amplitude with respect to a prescribed reference voltage, said signal voltages crossing at a voltage equal to said amplitude, means responsive to said sloping voltages for generating a triangular voltage wave having a base equal to the duration of said sloping voltages and having an apex equal in amplitude to one-half the voltage swing of said sloping waves, and means responsive to said triangular voltage wave for generating a rectangular voltage wave having its width symmetrically arranged about said apex.

3. The pulse generating circuit in accordance with claim 2 wherein said source comprises a symmetrical differential amplifier having two input circuits and two output circuits, a linear sawtooth voltage being coupled to one of said input circuits and said direct-current voltage being applied to the other of said input circuits, said sloping voltage waves being respectively generated in said output circuits.

4. A pulse generating circuit comprising a source of linear sawtooth wave voltage having its base at a prescribed direct-current voltage relative to a given reference and a source of direct-current voltage equal in amplitude to a predetermined direct-current voltage amplitude level on said sawtooth wave with respect to the direct-current voltage value of the base thereof, means responsive to said sawtooth wave and said predetermined direct-current amplitude voltage for generating a pair of signals having equal but opposite slopes and crossing over at a voltage equal to the predetermined voltage amplitude level, means responsive to said sloping signal voltages for generating a triangular wave voltage having a base equal to the duration of said sloping voltages and having an apex equal in amplitude to one-half the voltage swing of said sloping waves, and means responsive to said triangular wave voltage for generating a rectangular wave voltage having its width symmetrically arranged about a point corresponding in time to the position of said apex.

5. A pulse generating circuit comprising a linear sawtooth output voltage source, a direct-current voltage equal in amplitude to a preselected voltage amplitude level on the output of said sawtooth wave voltage source, said amplitude levels being measured from the base of the sawtooth wave voltage, means including a symmetrical differential amplifier responsive to the sawtooth voltage and the direct-current voltage for generating a pair of signals having equal but opposite slopes and crossing at a voltage equal to the preselected amplitude level, means responsive to said sloping signal voltages for generating a triangular wave voltage having a base equal to the duration of said sloping voltage waves and having an apex equal in amplitude to one-half the voltage swing of said sloping waves, said means comprising a source of negative and positive direct-current potentials, a first and second vacuum tube each having at least a plate, a grid, and a cathode, means for coupling said oppositely sloping waves to the respective grids of said first and second tubes, a resistor connecting said cathodes to said negative potential source, said plates being connected to said positive potential source, and means responsive to said triangular wave voltage for generating a rectangular wave voltage having its width symmetrically arranged about a point corresponding in time to the position of said apex.

References Cited in the file of this patent
UNITED STATES PATENTS

| | | |
|---|---|---|
| 2,262,838 | Deloraine | Nov. 18, 1941 |
| 2,485,665 | Shepherd | Oct. 25, 1949 |
| 2,561,475 | Jacobsen | July 24, 1951 |
| 2,571,017 | Dempsey et al. | Oct. 9, 1951 |
| 2,590,514 | Dehn et al. | Mar. 25, 1952 |
| 2,654,029 | Buchner | Sept. 29, 1953 |